May 9, 1961     E. W. GLOVER     2,983,119
UNIVERSAL JOINT
Filed Jan. 2, 1959
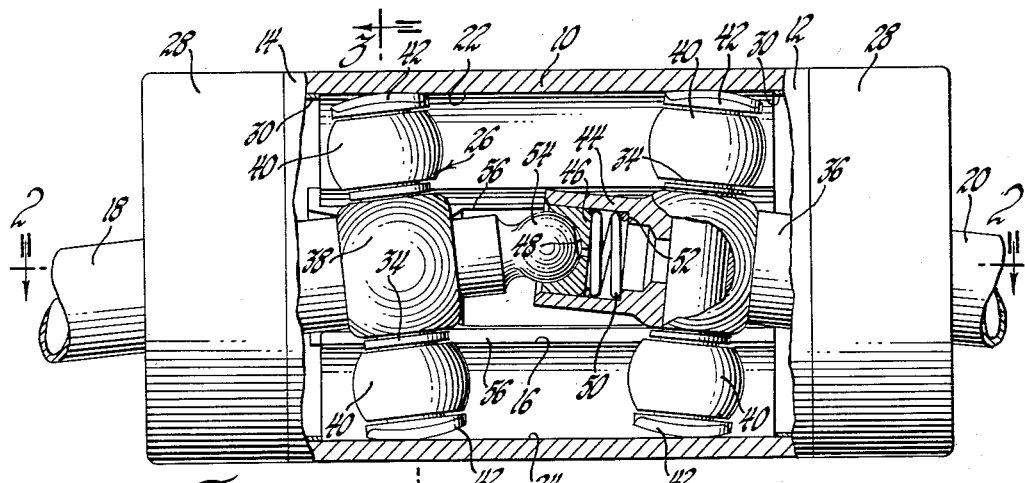
Fig.1
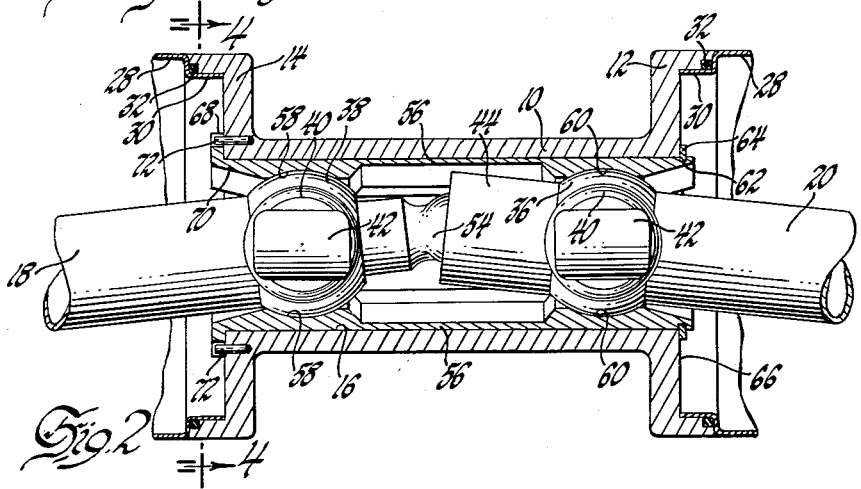
Fig.2
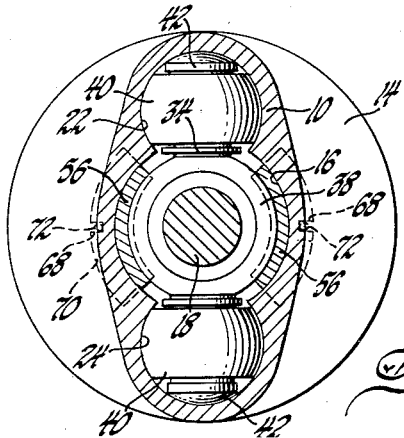
Fig.3
Fig.4
INVENTOR.
Earl W. Glover
BY
L. D. Burch
ATTORNEY

United States Patent Office 2,983,119
Patented May 9, 1961

2,983,119
UNIVERSAL JOINT

Earl W. Glover, Saginaw, Mich., assignor to General Motors Corporation, Detroit, Mich., a corporation of Delaware Filed Jan. 2, 1959, Ser. No. 784,786

2 Claims. (Cl. 64—21)

This invention relates to universal joints and more particularly to the type of universal joint having a housing with a plurality of axial openings therethrough to receive the input and output shafts and the trunnion and bearing assemblies.

Universal joints of the general type employing a housing having shaft receiving openings and bearing receiving openings axially disposed therethrough, have become well known in the automotive industry and are adapted to a wide variety of applications. Constant automobile design changes require corresponding changes in the component parts, from the standpoint of ease and economy in manufacture and improved vehicle engineering. Improved manufacturing methods have made the generally available universal joint too expensive for production usage, particularly due to the shape of the universal joint housing and the methods required to manufacture the housing.

In universal joints of the type described, the housing has been formed from a casting or forging, and blind boring operations have been required to provide the necessary openings. In using a double universal joint of this type, assembly has been extremely difficult and expensive according to modern production procedures. Limiting axial slip of the input and output shafts has been a constant problem, as has been the amount of wear in the input and output shaft connecting assembly because of the metal-to-metal rubbing contact taking place in available joints. Manufacturers have been required to spend great sums of money in the production and maintenance of replacement parts, and the vehicle user is deprived of the use of his automobile during those periods when replacements are necessary.

The device in which this invention is embodied eliminates many of the difficulties found in generally available universal joints. The joint comprises a housing having a shaft receiving opening axially formed therethrough and two bearing receiving openings, the axes of which are parallel to the axis of the shaft receiving bore and spaced on opposite sides thereof. Input and output shaft members extend into the housing, one from either end, the shafts being joined within the housing by a ball and socket connection. Trunnion and bearing assemblies extend transversely through the shaft members, the bearing sleeves and bearing caps thereof being received in the bearing receiving openings.

A pair of shoes are secured in the housing and within the shaft receiving opening to rotatably receive the input and output shaft members and to prevent axial movement thereof with respect to the housing. The shoes provide a means for limiting the axial slip of the shaft members without disturbing the workability of the joint. This provides economy of manufacture and ease in motor vehicle design through improved universal joints, not made possible by the universal joint embodying this invention. Great savings in time, labor and manufacturing costs are realized, and replacement parts and costs therefor are virtually eliminated. The vehicle user is not deprived of the use of his vehicle because of nonextraordinary part failure.

These and other features will become more apparent from the following description and drawings in which:

Figure 1 is an elevational view of the universal joint with parts broken away and in section to illustrate the location of the various parts.

Figure 2 is a cross-sectional view of the universal joint of Figure 1 taken substantially along the line 2—2 and looking in the direction of the arrows.

Figure 3 is a transverse cross-sectional view of the joint of Figure 1 taken substantially along the line 3—3 of Figure 1 and looking in the direction of the arrows.

Figure 4 is an end view of the joint of Figure 1 with parts broken away and in section to illustrate the means for retaining the shoes within the shaft receiving opening.

Referring more particularly to the drawings, a universal joint is shown having a housing 10, the housing having flanges 12 and 14 at either end thereof. A shaft receiving opening 16 is formed centrally through the housing 10 to receive the input and output shafts 18 and 20. A pair of spaced bearing receiving openings 22 and 24, having axes parallel to and spaced from the axis of the central shaft receiving opening 16, are axially formed through the housing to receive the trunnion and bearing assemblies, illustrated generally by the numeral 26. It may be seen that in manufacturing the housing 10, a single broaching operation is sufficient to form the shaft receiving opening and the bearing receiving openings from the rough casting, eliminating the blind boring operations generally required.

An oil and dirt seal may be provided at either end of the universal joint, retained thereon by a retaining sleeve 28. The retaining sleeve has a portion of decreased diameter 30 which is received in the flange 12 or 14 of the housing 10. An O-ring 32 is provided to prevent oil or foreign material from passing between the retaining sleeve and the housing.

A trunnion shaft 34 is transversely secured in the inner end of each of the shaft members 18 and 20 and passes through the spherical enlarged portions 36 or 38. The trunnion and bearing assembly is the usual type, having a bearing sleeve 40 disposed about either end of the trunnion shaft and about an annulus of needle bearings, not shown. A bearing cap 42 is received in each end of the trunnion shaft 34 and slides along the surface of the bearing receiving opening 22. The bearing sleeve 40 rotates about the trunnion shaft 34 with relatively little friction when angular movement takes place between the shaft members 18 and 20 and the housing 10.

The shaft member 20 is provided with a tubular extension 44 extending toward the shaft member 18 and within the housing 10. A socket block 46 is slidably received in the tubular extension 44 and has a hemispherical cavity 48 formed therein. A spring 50, also received in the tubular extension 44 and abutting a shoulder 52 therein, biases the socket block 46 in an outward direction. A spherical ball member 54 is formed on the end of the shaft member 18, the radius of the ball being substantially the same as the radius of the hemispherical cavity 48 in the socket block 46. The ball 54 is received in the cavity 48 and provides a connection between the input and output shafts 18 and 20 such that angular movement of one will be imparted to the other. Ball 54 riding in cavity 48 provides a supporting connection between the input and output shafts 18 and 20 such that the angular movement of one will be imparted to the other and cause the universal joint to be self-supporting. Since the angles of the shafts 18 and 20 are equal with respect to housing, the universal joint becomes approximately constant velocity.

To eliminate axial of the shaft members 18 and 20, a pair of shoes 56 are secured in the shaft receiving openings 16 in the housing 10 and extend substantially along the length thereof. A pair of spherical cavities 58 and 60 are formed in each shoe 56 to rotatably receive the spherical enlargements 36 and 38 formed near the inner ends of the input and output shaft members 18 and 20. An external arcuate groove 62 is formed in one end of the shoes 56 to receive a conventional snap ring 64 which abuts the end wall 66 of the housing 10. A notch 68 is formed in the flange 70 at the opposite end of the shoe to receive a locating pin 72 secured in the housing 10 and prevent the shoes from rotating within the shaft receiving opening. The flange 70, with the retaining ring 64, prevents axial movement of the shoe 56 within the opening 16, and the pin 72 received in the notch 68 prevents rotation of the shoe 56.

With the spherical enlargements 36 and 38 received in the spherical cavities 58 in the shoes 56, it may be seen that axial movement of the shaft members 18 and 20 relative to the housing 10 is eliminated. The trunnion and bearing assemblies and the shaft members are free to rotate with respect to the housing, thus properly transmitting driving torque through the universal joint. The ball and socket connection provides the proper angular relationship between the two shaft members at all times.

I claim:

1. A universal joint comprising a housing having an axial shaft receiving opening therein and spaced bearing assembly receiving openings therein communicating with said shaft receiving opening, input and output shafts extending into said shaft receiving opening, a substantially spherical enlargement formed in each of said shafts and receivable in said shaft receiving opening, a tubular shaft portion extending from one of said shafts and toward the other of said shafts within said housing, a spherical member extending from the other of said shafts and receivable in said tubular extension, a socket means including a pair of members having spherical inner surfaces and slidably receivable in said tubular extension, said surfaces defining a generally hemispherical cavity adapted to receive said spherical member and form a connection between said shaft members, and spring means in said tubular extension to bias said socket means into engagement with said spherical member and take up any wear occurring in said socket block or in said spherical member, a pair of shoes secured in said shaft receiving opening in said housing and extending along the length thereof and secured at opposite ends of said shaft receiving opening and externally thereof, each of said shoes having a pair of spaced spherical cavities to rotatably receive said spherical enlargements and prevent axial movement of said shafts relative to said housing, and a trunnion and bearing assembly secured in each of said shafts and extending into said bearing receiving openings to allow relatively frictionless angular movement of said shafts with respect to said housing.

2. In a universal joint, the combination comprising a one-piece housing, input and output shafts extending into said housing, ball and socket connecting means within said housing and joining said input and output shafts, and means for preventing axial movement of said shafts with respect to said housing; said housing having a shaft receiving opening centrally formed therethrough and a pair of bearing receiving openings on opposite sides of said shaft receiving opening; said input and output shafts including spherically formed enlargements near the ends thereof within said housing, a tubular extension formed from one of said shaft members and extending toward the other of said shaft members and within said housing, a spherical member extending from the other of said shaft members and receivable in said tubular extension, a socket means including a pair of members having generally spherical inner surfaces and slidingly receivable in said tubular extension, said inner surfaces defining a generally hemispherical cavity receiving said spherical member to form a connection between said shaft members, and spring means in said tubular extension to bias said socket means into engagement with said spherical member and take up any wear occurring in said socket block or in said spherical member; said means for preventing axial movement of said shafts including a pair of shoes secured in said housing and in said shaft receiving opening and extending along the length thereof and having axially spaced hemispherical cavities formed therein to rotatably receive said spherical enlargements formed on said shaft members, said shoes retaining said spherical enlargements and said shafts in fixed axial position within said housing and allowing relative oscillation of said shaft members with respect to said housing for torque transmission from one of said shafts to the other.

References Cited in the file of this patent

UNITED STATES PATENTS

| | | |
|---|---|---|
| 2,106,672 | Wollner | Jan. 25, 1938 |
| 2,211,388 | Salvetti | Aug. 13, 1940 |
| 2,255,762 | Dodge | Sept. 16, 1941 |
| 2,293,717 | Dodge | Aug. 25, 1942 |
| 2,329,903 | Horne | Sept. 21, 1943 |

FOREIGN PATENTS

| | | |
|---|---|---|
| 962,383 | France | June 8, 1950 |